United States Patent [19]

Yoshida, deceased, et al.

[11] Patent Number: 5,153,067

[45] Date of Patent: Oct. 6, 1992

[54] COLLAGEN POWDER HAVING GOOD DISPERSION STABILITY AND USE THEREOF AS LEATHER-LIKE SURFACE LAYER-FORMING AGENT

[75] Inventors: Eiichi Yoshida, deceased, late of Tokyo, by Hiroko Yoshida, legal representative, Tokyo; Tetsuo Wada, Kawasaki; Mina Saito, Kawasaki; Tetsuhiko Yamaguchi, Kawasaki, all of Japan

[73] Assignee: Showa Denko K.K., Tokyo, Japan

[21] Appl. No.: 592,101

[22] Filed: Oct. 3, 1990

[30] Foreign Application Priority Data

Oct. 6, 1989 [JP] Japan .................................. 1-261862
Dec. 25, 1989 [JP] Japan .................................. 1-335991
Mar. 5, 1990 [JP] Japan .................................. 2-53387

[51] Int. Cl.$^5$ .............................................. B32B 5/16
[52] U.S. Cl. ...................................... 428/402; 524/11
[58] Field of Search ........................... 524/11; 428/402

[56] References Cited

U.S. PATENT DOCUMENTS

| | | | |
|---|---|---|---|
| 3,663,472 | 5/1972 | Raymond | 524/11 |
| 4,287,252 | 9/1981 | Dimiter | 524/11 |
| 4,866,110 | 9/1989 | Lee | 524/11 |

*Primary Examiner*—Edith Buffalow
*Attorney, Agent, or Firm*—Sughrue, Mion, Zinn, Macpeak & Seas

[57] ABSTRACT

Disclosed is a collagen powder having a good dispersion stability, in which the content of particles having a particle size smaller than 40 µm is at least 85% by weight, the water absorption is 120 to 300%, and the apparent bulk density is 0.10 to 0.30 g/cc. This collagen powder is advantageously used for a leather-like surface layer-forming agent and a leather-like molded article.

11 Claims, No Drawings

COLLAGEN POWDER HAVING GOOD DISPERSION STABILITY AND USE THEREOF AS LEATHER-LIKE SURFACE LAYER-FORMING AGENT

BACKGROUND OF THE INVENTION (1) Field of the Invention

The present invention relates to a novel collagen powder, a leather-like surface layer-forming agent comprising this powder, and a leather-like molded article.

(2) Description of the Related Art

In the fields of sheets such as vinyl chloride sheets and artificial leathers, nonwoven fabrics, furniture and household electric appliances, recent trends toward a higher quality have brought about a demand for sheet surfaces having the appearance, feel, and functions resembling those of natural leather. To meet this requirement, a process has been proposed in which a collagen powder such as a leather fiber powder or a leather powder formed by pulverizing leather scraps is used together with a synthetic polymeric resin such as a polyurethane resin, a polyester resin, a polyacrylic resin, a polyvinyl chloride resin or a polyolefin, or a synthetic rubber such as an SB rubber, to form a covering layer on the surface of an automobile interior trim, a construction interior material, furniture or a precision machine, or to form a molded article such as a steering wheel cover of an automobile, whereby performances resembling those of natural leather are imparted thereto.

Various proposals have been made for the above-mentioned collagen powder, such as the leather fiber powder or leather powder disclosed, for example, in Japanese Unexamined Patent Publication No. 49-7405, Japanese Unexamined Patent Publication No. 63-218286, and Japanese Unexamined Patent Publication No. 63-236636. In the collagen powder disclosed in Japanese Unexamined Patent Publication No. 49-7405, since the size of the collagen fiber is large, i.e., 80 mesh (180 μm), where the collagen powder is used together with a thermoplastic resin powder for preparing a sheet-like artificial leather, complicated steps are necessary for obtaining a leather-like covering layer. In Japanese Unexamined patent Publication No. 63-218286, as in the above-mentioned patent publication, the leather powder is particulate and the maximum particle size is 150 mesh (100 μm), and therefore, a dry, smooth feeling cannot be obtained, and the moisture-absorbing or moisture-releasing property thereof is poor. Also, since the collagen powder disclosed in Japanese Unexamined Patent Publication No. 63-236636 is a leather powder obtained merely by pulverizing leather scraps, the tanning treatment is conducted on the leather powder in the state of a hide, and thus the leather fiber is not uniformly tanned. Accordingly, the water absorption of the powder is lower than 120% by weight and the apparent bulk density (JIS K-6721) is larger than 0.30 g/cc, and accordingly, the powder is defective in that the moisture-absorbing and moisture-releasing properties are poor. Moreover, since the oil absorption (JIS K-5101) is low, the collagen powder is sedimented in a resin or a resin solution because of the difference between the true density of the collagen powder and the density of the resin solution, and the powder is caked and cannot be re-dispersed. Namely, the collagen powder has a poor dispersion stability. Therefore, the collagen powder is unsatisfactory for practical use.

No standardized method for measuring the water absorption of a powder has been set as yet, and accordingly, the following method is adopted in the present invention. Namely, 1.0 g (Wa) of a powder sample is immersed in water for more than 1 hour, to absorb the water in the sample, and the sample is then thoroughly drained and is placed in the form of a circle having a diameter of 4 cm, on a filter paper (Filter Paper No. 5C supplied by Toyo Roshi; diameter 9 cm). Several filter papers are laminated above and below the sample, a weight of 20 kg is placed on the assembly, and a dehydration under compression is carried out for 3 minutes to remove excess water adhering thereto. The weight (Wb) of the sample is then measured, and the water absorption is calculated according to the following formula:

$$\text{Water absorption (\% by weight)} = [(Wb - Wa)/Wa] \times 100$$

SUMMARY OF THE INVENTION

To overcome the above problems of the conventional techniques, the present carried out an investigation thereof based on the fact that, to enable a collagen powder to show excellent leather-like feel and touch, and a satisfactorily smooth surface covering or molded article formed together with a synthetic resin, the particle size of the collagen powder must be small, the moisture-absorbing and moisture-releasing properties must be high, and the dispersion stability in a resin or a solution thereof must be good. As a result, it was found that a collagen powder formed by subjecting an animal texture containing a large quantity of collagen, such as a swine or bovine hide, to a purification treatment and a wet pulverization treatment to form a collagen fiber dispersion, tanning the collagen fiber with a tanning agent such as a chromium compound or a zirconium compound, and passing the tanned collagen fiber through a dehydration, drying and pulverization sequence, in which the content of particles having a particle size (as measured by a Coulter Counter) smaller than 40 μm is at least 85% by weight, the water absorption is 120 to 300% by weight and the apparent bulk density is 0.10 to 0.30 g/cc, answers the above purpose, and the present invention is based on this finding.

DESCRIPTION OF THE PREFERRED EMBODIMENTS

The collagen powder of the present invention is characterized in that the collagen powder can impart an appearance, feel, and functions resembling those of a leather to a covering layer or molded article formed together with a synthetic resin, and that the dispersion stability of the collagen powder in a synthetic resin or a solution thereof is good. To impart a smooth and dry touch to a leather-like surface covering layer formed on a substrate such as a vinyl chloride resin, the content of particles having a particle size of more than 40 μm is kept below 15% by weight, and to increase the moisture-absorbing and moisture-releasing properties, the water absorption is adjusted to 120 to 300% by weight. Furthermore, to increase the speed of the absorption and release of moisture, the apparent bulk density is adjusted to 0.10 to 0.30 g/cc. A smaller particle size of the collagen powder is preferable when a smooth surface layer is desired, and the intended object can be attained if the content of particles having a particle size of more than 40 μm is lower than 15% by weight. If the content of particles having a particle size of more than 40 μm is larger than 15% by weight, the surface smoothness is lost. A higher water absorption is preferable, for enhancing the moisture-absorbing and moisture-releasing properties, but if the water absorption is higher than 300% by weight, the volume of the powder is increased beyond a necessary level, by an absorption of water, and the strength of the surface layer is reduced. If the water absorption is lower than 120% by weight, a satisfactory moisture-absorbing or moisture-releasing effect cannot be obtained and the collagen powder cannot be put to practical use. A lower apparent bulk density is preferable for increasing the moisture-absorbing and moisture-releasing speeds, but if the apparent bulk density is lower than 0.10 g/cc, dusting occurs and the mixing of the collagen powder with a binder resin solution becomes difficult, and therefore, a collagen powder having too low an apparent bulk density is not suitable for practical use. If the apparent bulk density exceeds 0.30 g/cc, the moisture-absorbing and moisture-releasing properties are drastically lowered and good results cannot be obtained.

In the present invention, preferably the oil absorption of the collagen powder is 0.80 to 1.70 ml/g. A higher oil absorption is preferable for increasing the dispersion stability in a resin or a solution thereof, because the absorption of a resin or a solvent causes the collagen powder to be swollen and the true density and control of the sedimentation of the collagen powder is reduced, and even if the powder is sedimented, the sedimented powder does not form a hard mass and a re-dispersion may occur. Further, even if the oil absorption is high, e.g., more than 1.70 ml/g, a substantial increase of the effect of enhancing the dispersion stability cannot be obtained. If the oil absorption is lower than 0.80 ml/g, the true density of the collagen powder which has absorbed an oil in a resin or a solution thereof is not sufficiently reduced, and often a good dispersion stability cannot be obtained. Therefore, most preferably the oil absorption is 1.0 to 1.5 ml/g.

The process for the preparation of the collagen powder of the present invention is not particularly critical. For example, the collagen powder can be prepared according to the following process, though other processes can be adopted.

Namely, the collagen powder is prepared by subjecting an animal tissue such as an animal hide to purification, wet pulverization, tanning, dehydration, drying, and pulverization, in that sequence. As the animal tissue, there can be used tissues containing a large quantity of collagen, such as hides, bones and tendons of mammals such as bovine, equine, swine, and sheep, and of all other vertebrates.

In the purification treatment, the animal tissue, which has been subjected to an alkali treatment and washed with water, is treated with a protease type enzyme to remove impurities other than collagen, such as fats, polysaccharides and proteins, and obtain a purified collagen. As the protease enzyme, there can be used at least one member selected from enzymes customarily used for the purification of hides, such as pancreatic trypsin, papain, pancreatin, and Bacillus hypha alkaline protease. To impart a high heat resistance and light resistance to a leather-like surface covering layer formed together with a synthetic resin binder, preferably a collagen powder from which the above-mentioned impurities have been substantially completely removed is used, and accordingly, preferably papain and pancreatin are used. To increase the activity of the enzyme, and increase the efficiency of the separating and removing of the impurities, the pH value is adjusted by using sodium hydrogencarbonate and/or a quaternary ammonium salt or hydroxide, and L-glutamic acid, potassium hydrogen-L-tartaric acid, a nonionic surface active agent or sodium chondroitin sulfate is used as an assistant. As a specific example of the nonionic surface active agent, there can be mentioned Triton X-100 (supplied by Kishida Kagaku), which is an alkylphenyl ether of polyethylene glycol having a high HLB value.

The wet pulverization is carried out to uniformalize the properties of the formed collagen powder and enable the subsequent tanning treatment to be conducted easily and uniformly. Namely, the purified collagen mass is swollen with water, and a dispersion of a collagen fiber or a solution of a collagen molecule is formed. For the preliminary treatment, the pH value is adjusted to 2 to 8, the collagen mass is roughly pulverized by a meat grinder, and the pulverization is then carried out by using a beater or a rotary blade disintegrator and the like. To prevent a change of the collagen to gelatin, and prevent an elevation of the temperature due to friction among the collagen fibers during the wet pulverization, preferably the concentration of the collagen fiber or molecule is lower than 30% by weight. Especially, where the apparent bulk density is reduced to a level lower than 0.20 g/cc and the oil absorption is adjusted to 1.0 to 1.5 ml/g, to thereby increase the moisture-absorbing and moisture-releasing speeds, preferably the wet pulverization is carried out under a condition wherein the fiber is kept in the state of a fine fiber by adjusting the treatment pH value to 4.5 to 8.0, and adding a salt such as sodium chloride, sodium sulfate or ammonium sulfate.

The tanning treatment is conducted to maintain the water absorption of the collagen powder at a predetermined level and increase the heat resistance, and according to this treatment, a tanning agent is added to the dispersion of the collagen fiber or the solution of the collagen molecule to bond the fibers or molecules of collagen to one another. As the tanning agent, there can be mentioned inorganic compounds such as chromium sulfate, zirconyl sulfate, zirconium sulfate, and aluminum sulfate, magnesium sulfate, zinc sulfate, and titanium complex compounds, and organic compounds such as formaldehyde, glutaraldehyde, and tannin. Two or more of these tanning agents can be used in combination.

The amount added of the tanning agent, which gives a water absorption of 120 to 300% by weight to the collagen powder, is 0.80 to 2 parts by weight in the case of chromium sulfate, 0.80 to 10 parts by weight in the case of zirconyl sulfate or zirconium sulfate, 2 to 20 parts by weight in the case of aluminum sulfate, 0.80 to 2 parts by weight in the case of formaldehyde or glutaraldehyde or 1.50 to 5 parts by weight in the case of tannin, per 100 parts by weight of the collagen fiber or molecule. To obtain a collagen powder having a white appearance, zirconyl sulfate, zirconium sulfate, and aluminum sulfate are preferably used.

The dehydration treatment is conducted to reduce the water content in the collagen fiber aggregate obtained by the tanning treatment, facilitate drying, and reduce the drying load, and a usual centrifugal separator, filter press or screw press can be used for this treatment. Preferably, the water content is reduced to less than 70% by weight.

The drying treatment is conducted to further reduce the water content of the wet collagen mass formed by reducing the water content by the dehydration treatment, and to facilitate the subsequent pulverization treatment, and this treatment is accomplished according to customary procedures using a fluidized type, tray type or paddle type drier. Preferably, the water content is reduced to less than 10% by weight.

The pulverization treatment is conducted to pulverize the collagen fiber mass obtained by the drying treatment, to obtain a collagen powder in which the content of particles having a particle size smaller than 40 $\mu$m is at least 85%. This treatment is accomplished by using a usual jet mill, hammer mill or ball mill. Preferably, the particle size distribution of the obtained powder is close to the normal distribution, and the median diameter is 4 to 25 $\mu$m and the maximum diameter 63 $\mu$m (passing through 235 mesh).

The thus-prepared collagen powder is different from the conventional leather powder obtained by merely pulverizing a leather prepared by tanning a bare hide (fiber bundle) formed by purification, in that the wet pulverization treatment caused the collagen fiber to be once completely disintegrated or converted to a molecular state, and since the tanning treatment is carried out in this state, the disintegrated fiber is uniformly agglomerated to form an agglomerate of fine fibers and produce a structure of agglomerated fine fibers, and the presence of fine fibers covering the particle surfaces and the presence of voids in the interiors of particles can be observed. Accordingly, the apparent bulk density is lower than that of the conventional leather powder, and is from 0.10 to 0.30 g/cc, the specific surface area is increased, and the water absorption and oil absorption are increased.

The collagen powder of the present invention is mixed in and used as a paint or artificial leather comprising as a binder a synthetic resin such as a polyurethane resin, a polyester resin, a polyacrylic resin or a polyvinyl chloride resin. Furthermore, the collagen powder of the present invention is advantageously used by mixing in a molding material comprising as a base a synthetic resin such as a polyolefin, for example, polyethylene or polypropylene, polybutadiene, polystyrene or an ABS resin, or a synthetic rubber such as an SB rubber. In each case, there can be obtained a paint, artificial leather or molding material resembling natural leather in performances such as appearance, feel, and moisture-absorbing and moisture-releasing properties. For example, in a typical instance of the paint, the collagen powder is incorporated and thoroughly dispersed in a polyurethane resin as the binder in an amount of 30 to 200 parts by weight per 100 parts of the solids of the resin, and a solvent is added according to need to adjust the concentration to an appropriate level. The thus-formed paint is coated by a spray gun or a coater. In a typical instance of the artificial leather, the collagen powder is incorporated into a polyurethane resin in an amount of 30 to 200 parts by weight per 100 parts by weight of the resin, and the mixture is kneaded and bonded to a polyvinyl chloride sheet or a nonwoven fabric sheet. The mixing of the binder with the collagen powder also can be accomplished by dispersing the collagen powder in a solvent for the binder and mixing the dispersion with the binder, or by dispersing the collagen powder directly in the binder. As the solvent, there can be used hydrocarbons such as toluene and xylene, ketones such as methylisobutyl ketone and cyclohexanone, and esters such as ethyl acetate and butyl acetate A pigment such as titanium dioxide or carbon black, an extender pigment such as kaolin or talc, and a delustering agent such as silica can be used in combination with the synthetic resin binder and the collagen powder, whereby the hue and feel can be changed. Furthermore, a convexity-concavity pattern can be formed on the surface by embossing or the like, to enhance the leather-like feel. The thus-obtained product has an appearance, feel, and moisture-absorbing and moisture-releasing properties resembling those of artificial leather, and a polyvinyl chloride leather, artificial leather or paint having a high heat resistance and light resistance can be provided.

In a typical instance of the molding material, as in the case of the artificial leather, the collagen powder is incorporated into a polyurethane resin in an amount of 30 to 200 parts by weight per 100 parts by weight of the polyurethane resin, and the mixture is kneaded and molded by an extruder or the like. According to need, a plasticizer, a stabilizer, a curing agent, a catalyst, a filler, a colorant, a reactive monomer, a solvent, a dispersant and other additives can be incorporated into the resin, and the resulting composition can be used as a resin compound. The resin compound can be a solid or a liquid. The obtained resin composition is molded to form a leather-like article by a customary melt molding process, for example, injection molding, hollow molding, calender molding or extrusion molding.

The collagen powder of the present invention consists of particles finer than those of the conventional collagen powder, and in the collagen powder of the present invention, the content of particles having a particle size smaller than 40 $\mu$m is at least 85% by weight. Accordingly, the collagen powder of the present invention has a very good compatibility with a thermoplastic resin compound. Moreover, the contact resistance of the collagen powder to a cylinder, screw or die of a molding machine is close to that of the thermoplastic resin composition, and therefore, the extrusion can be smoothly performed at the molding step, and a leather-like molded article having an excellent uniformity and high quality can be obtained without damage to the molding machine because of a change of the injection pressure.

The leather-like molded article of the present invention is obtained by mixing the collagen powder into a thermoplastic resin and molding the mixture to impart a leather-like appearance, feel, and functions to the molded article, and according to the present invention, a good smoothness can be imparted to the surface of the molded article, and good moisture-absorbing and moisture-releasing properties and high moisture-absorbing and moisture-releasing speeds also can be imparted. Accordingly, a molded article having properties very close to those of natural leather can be provided. The leather-like molded article obtained according to the present invention can be widely used as a soft film or sheet, an armrest of a chair, furniture, a console box, a handle grip and the like.

The present invention will now be described in detail with reference to the following examples, that by no means limit the scope of the invention.

EXAMPLE 1

1) Preparation of Collagen Powder

A. Purification Treatment

A bovine bare hide was alkali-treated with lime and washed with water, and 500 parts by weight (the dry amount was 100 parts by weight; parts by weight will be abbreviated to parts hereinafter) of the treated hide was immersed in a treating liquid having a composition as described below, the pH value of which was adjusted to 8.1 by sodium bicarbonate.

| | |
|---|---|
| Papain | 0.60 part |
| Pancreatin | 0.15 part |
| L-Glutamic acid | 0.35 part |
| Sodium chondroitin sulfate | 0.003 part |
| Potassium hydrogen-L-tartrate | 0.35 part |
| Triton X-100 | 0.50 part |
| Water | 5000 parts |

In a household washing machine, stirring was carried out at room temperature for 12 hours to remove impurities, and after the water washing, the treated product was immersed in lactic acid and the pH value was adjusted to 4.0 to obtain a purified collagen texture.

B. Wet Pulverization Treatment

The collagen texture obtained in A above was minced by a meat grinder and diluted with water so that the concentration of the dry weight of the starting hide was 3.50%. The pH value of the dilution was adjusted to 5.5 by sodium bicarbonate, and the wet pulverization was carried out by using a rotary blade disintegrator.

Tanning Treatment

After the wet pulverization treatment, 4.5 parts of aluminum sulfate and 2.5 parts of zirconyl sulfate were added as the tanning agent to the treated tissue in a paper-forming beater, and the tanning treatment was carried out to obtain a collagen fiber agglomerate.

D. Dehydration, Drying, and Pulverization Treatments

The collagen fiber agglomerate obtained at C above was dehydrated by a screw press dehydrator so that the water content was reduced to 67% by weight, and then dried by a hot air tray-type drier to reduce the water content to 9.5% by weight. The dried product was then pulverized by a hammer mill, to obtain two kinds of collagen powders having a different particle size and physical properties, as shown in Table 1.

2. Application Test

The obtained collagen powder was applied to a paint, an artificial leather, and a molding material, as described in E, F, and G below, and the items shown in Table 1 were tested. The results are shown in Table 1.

E. Paint

To a resin solution of 100 parts of a polyurethane resin in 200 parts of ethyl acetate was added 50 parts of the collagen powder, and the collagen powder was thoroughly dispersed in the solution to form a clear paint. The paint was coated on the surface of a transparent polycarbonate plate by using a spray gun, so that the dry thickness of the coating was 50 μm, and the formed coating was dried.

F. Artificial Leather

To a resin solution of 100 parts of a polyurethane resin in 200 parts of ethyl acetate were added 50 parts of the collagen powder and 8 parts of carbon black, and the collagen powder and carbon black were thoroughly dispersed to obtain a surface-treating agent. The treating agent was coated on the surface of a release paper by using a gravure coater, so that the dry thickness of the coating was 30 μm. The coating was dried and an adhesive layer was formed on the surface of the coating, and the coating was bonded to a nonwoven fabric sheet to obtain an artificial leather.

G. Molding Material

To 100 parts of a foamable polyerethane resin were added 50 parts of the collagen powder and 8 parts of carbon black, and the mixture was kneaded, and melt-molded into a sheet by a melt molding machine, to obtain a molded sheet.

EXAMPLE 2

1) Preparation of Collagen Powder

A. Purification Treatment

A bovine bare hide was alkali-treated with lime and washed with water, and 500 parts by weight (the dry amount was 100 parts by weight; parts by weight will be abbreviated to parts hereinafter) of the treated hide was immersed in a treating liquid having a composition as described below, the pH value of which was adjusted to 9.0 by 0.05 part of tetramethylammonium hydroxide and sodium bicarbonate.

| | |
|---|---|
| Papain | 0.55 part |
| Pancreatin | 0.15 part |
| L-Glutamic acid | 0.30 part |
| Sodium chondroitin sulfate | 0.002 part |
| Potassium hydrogen-L-tartrate | 0.30 part |
| Triton X-100 | 0.50 part |
| Water | 5000 parts |

In a household washing machine, stirring was carried out at room temperature for 12 hours to remove impurities, and after the water washing, the treated product was immersed in lactic acid and the pH value was adjusted to 4.0 to obtain a purified collagen texture.

B. Wet Pulverization Treatment

The collagen texture obtained in A above was minced by a meat grinder and diluted with water so that the concentration of the dry weight of the starting hide was 0.80%. The pH value of the dilution was adjusted to 3.5 by lactic acid, and the wet pulverization was carried out by using a paper-forming beater.

C. Tanning Treatment

After the wet pulverization treatment, 2.5 parts of aluminum sulfate and 3.0 parts of zirconium sulfate were added as the tanning agent to the treated tissue in a paper-forming beater, and the tanning treatment was carried out to obtain a collagen fiber agglomerate.

D. Dehydration, Drying and Pulverization Treatments

The collagen fiber agglomerate obtained at C above was dehydrated by a screw press dehydrator so that the water content was reduced to 67% by weight, and then dried by a hot air tray-type drier to reduce the water content to 5.0% by weight. The dried product was then pulverized by a hammer mill, to obtain a collagen powder having the physical properties shown in Table 1.

2) Application Test

The obtained collagen powder was applied to a paint, an artificial leather, and a molding material, as described in E, F, and G of Example 1, and the items shown in Table 1 were tested. The results are shown in Table 1.

COMPARATIVE EXAMPLE 1 (POWDER HAVING LARGE PARTICLE SIZE)

A collagen powder was prepared in the same manner as described in Example 2, except that, at the pulverization treatment, the content of particles having a particle size smaller than 40 μm was adjusted to 72% by weight, and the collagen powder was applied to a paint, an artificial leather, and a molding material, as described in E, F, and G of Example 1, and the items shown in Table 1 were tested. The results are shown in Table 1.

EXAMPLE 3

1) Preparation of Collagen Powder

A. Purification Treatment

A bovine bare hide was alkali-treated with lime and washed with water, and 500 parts by weight (the dry amount was 100 parts by weight; parts by weight will be abbreviated to parts hereinafter) of the treated hide was immersed in a treating liquid having a composition described below, the pH value of which was adjusted to 9.0 by 0.05 part of tetramethylammonium hydroxide and sodium bicarbonate.

| | |
|---|---|
| Papain | 0.50 part |
| Pancreatin | 0.20 part |
| L-Glutamic acid | 0.25 part |
| Sodium chondroitin sulfate | 0.002 part |
| Potassium hydrogen-L-tartrate | 0.30 part |
| Triton X-100 | 0.45 part |
| Water | 5000 parts |

In a household washing machine, stirring was carried out at room temperature for 12 hours to remove impurities, and after the water washing, the treated product was immersed in lactic acid and the pH value was adjusted to 2.6 to obtain a purified collagen texture.

B. Wet Pulverization Treatment

The collagen texture obtained in A above was minced by a meat grinder and diluted with water so that the concentration of the dry weight of the starting hide was 0.80%. The pH value of the dilution was adjusted to 3.5 by sodium bicarbonate, and the wet pulverization was carried out by using a paper-forming beater.

C. Tanning Treatment

After the wet pulverization treatment, 2.8 parts of aluminum sulfate and 2.8 parts of zirconyl sulfate were added as the tanning agent to the treated tissue in a paper-forming beater, and the tanning treatment was carried out to obtain a collagen fiber agglomerate.

D. Dehydration, Drying, and Pulverization Treatments

The collagen fiber agglomerate obtained at C above was dehydrated by a screw press dehydrator so that the water content was reduced to 67% by weight, and then dried by a hot air tray-type drier to reduce the water content to 5.5% by weight. The dried product was then pulverized by a hammer mill, to obtain a collagen powder having the physical properties shown in Table 1.

2) Application Test

The obtained collagen powder was applied to a paint, an artificial leather, and a molding material, as described in E, F, and G of Example 1, and the items shown in Table 1 were tested. The results are shown in Table 1.

COMPARATIVE EXAMPLE 2 (LEATHER POWDER; POWDER HAVING HIGH APPARENT BULK DENSITY, LOW WATER ABSORPTION AND LOW OIL ABSORPTION)

1) Preparation of Leather Powder

An ordinary chromium-tanned leather scrap was finely cut, heated and swollen with heated steam at 110° C. for 3 hours in an autoclave, and then dried and pulverized in the same manner as described in Example 1, to obtain a leather powder having the physical properties shown in Table 1.

2) Application Test

The obtained collagen powder was applied to a paint, an artificial leather, and a molding material, as described in E, F, and G of Example 1, and the items shown in Table 1 were tested. The results are shown in Table 1.

As seen from the results shown in Table 1, the collagen powder of the present invention has much a higher effect of improving performances such as the appearance, feel, and moisture-absorbing and moisture-releasing properties, than the conventional collagen powder, regardless of the kind of substrate used.

TABLE 1

Physical Properties of Powders and Results of Application Tests

| | Physical Properties of Powders | | | | | Test Items | | | moisture absorbing and moisture-releasing properties | |
|---|---|---|---|---|---|---|---|---|---|---|
| | content (% by weight) of particles having size smaller than 40 μm | median diameter (μm) | water absorption[1] (% by weight) | apparent bulk density (g/cc) | oil absorption (ml/g) | Application Test Samples | dispersion stability[2] | feel[3] | water-absorbing property[4] | water-releasing property[5] |
| Example 1a | 98.0 | 7.3 | 175 | 0.18 | 1.35 | E | o | o | 3.18 | 19.0 |
| | | | | | | F | o | o | 3.42 | 22.3 |
| | | | | | | G | o | o | 3.63 | 23.0 |
| Example 1b | 89.5 | 21.2 | 155 | 0.20 | 1.28 | E | o | c | 3.01 | 18.6 |
| | | | | | | F | o | c | 3.22 | 21.9 |
| | | | | | | G | c | o | 3.37 | 22.5 |
| Example 2 | 85.7 | 23.5 | 148 | 0.26 | 0.95 | E | c | c | 2.95 | 18.3 |
| | | | | | | F | c | o | 3.15 | 21.2 |

TABLE 1-continued

Physical Properties of Powders and Results of Application Tests

| | Physical Properties of Powders | | | | | Test Items | | | |
|---|---|---|---|---|---|---|---|---|---|
| | | | | | | | | | moisture absorbing and moisture-releasing properties |
| | content (% by weight) of particles having size smaller than 40 μm | median diameter (μm) | water absorption[1] (% by weight) | apparent bulk density (g/cc) | oil absorption (ml/g) | Application Test Samples | dispersion stability[2] | feel[3] | water-absorbing property[4] | water-releasing property[5] |
| Comparative Example 1 | 72.0 | 34.6 | 137 | 0.30 | 0.91 | G | ○ | ○ | 3.28 | 21.9 |
| | | | | | | E | ○ | Δ | 2.88 | 18.0 |
| | | | | | | F | ○ | Δ | 3.11 | 20.8 |
| | | | | | | G | ○ | Δ | 3.23 | 21.2 |
| Example 3 | 88.5 | 20.4 | 125 | 0.28 | 0.65 | E | x | ○ | 2.45 | 13.3 |
| | | | | | | F | x | ○ | 2.66 | 13.7 |
| | | | | | | G | x | ○ | 2.79 | 14.5 |
| Comparative Example 2 | 89.5 | 19.8 | 93 | 0.42 | 0.48 | E | x | x | 1.56 | 11.1 |
| | | | | | | F | x | x | 1.74 | 12.4 |
| | | | | | | G | x | x | 1.81 | 13.2 |

Note
[1]The water absorption was determined according to the following method. Namely, 1.0 g (Wa) of a powder sample was immersed in water for more than 1 hour to absorb the water in the sample, and the sample was thoroughly drained and was placed in the form of a circle having a diameter of 4 cm on a filter paper (Filter Paper No. 5C supplied by Toyo Roshi; diameter 9 cm). Several filter papers were laminated above and below the sample, and a weight of 20 kg was placed on the assembly, and a dehydration under compression was carried out for 3 minutes to remove excess water adhering thereto. Then the weight (Wb) of the sample was measured, and the water absorption was calculated according to the following formula: Water absorption (% by weight) = [(Wb − Wa)/Wa] × 100
[2]In a 50-ml graduated cylinder was charged 50 ml of a sample for the application test, the sample was allowed to stand at room temperature for 7 days, and the dispersion stability was evaluated based on the volume of the precipitated substance and the re-dispersibility of the sedimented substance. The scale of the top end of the sedimented substance was read and the volume was determined, and the re-dispersibility was judged on the ease of dispersion at the time of agitation of the sedimented substance with a rod. good (large volume, easy re-dispersion): ⊙ > ○ > Δ > x: bad (small volume, difficult re-dispersion)
[3]The feel was evaluated based on the feel observed when the surface layer was touched by the hand. good: ⊙ > ○ > Δ > x: bad
[4]The water-absorbing property was determined according to JIS P-8140 (unit: g/m²). A larger value is preferable. The practical necessary level is 2.50.
[5]After the measurement of the water-absorbing property[4], the weight (mg) of absorbed water evaporated for 1 second from 1 m² of the surface layer at a temperature of 20° C. and a relative humidity of 60% was measured as the water-releasing property. A larger value is preferable. The practical necessary level is 15.0.

Note

1) The water absorption was determined according to the following method. Namely, 1.0 g (Wa) of a powder sample was immersed in water for more than 1 hour to absorb the water in the sample, and the sample was thoroughly drained and was placed in the form of a circle having a diameter of 4 cm on a filter paper (Filter Paper No. 5C supplied by Toyo Roshi; diameter 9 cm). Several filter papers were laminated above and below the sample, and a weight of 20 kg was placed on the assembly, and a dehydration under compression was carried out for 3 minutes to remove excess water adhering thereto. Then the weight (Wb) of the sample was measured, and the water absorption was calculated according to the following formula:

Water absorption (% by weight) = [(Wb − Wa)/Wa] × 100

2) In a 50-ml graduated cylinder was charged 50 ml of a sample for the application test, the sample was allowed to stand at room temperature for 7 days, and the dispersion stability was evaluated based on the volume of the precipitated substance and the re-dispersibility of the sedimented substance. The scale of the top end of the sedimented substance was read and the volume was determined, and the re-dispersibility was judged on the ease of dispersion at the time of agitation of the sedimented substance with a rod.

good (large volume, easy re-dispersion): o > >Δ>x : bad (small volume, difficult re-dispersion)

3) The feel was evaluated based on the feel observed when the surface layer was touched by the hand.

good: >o>Δ>x : bad

4) The water-absorbing property was determined according to JIS P-8140 (unit: g/m²). A larger value is preferable. The practical necessary level is 2.50.

5) After the measurement of the water-absorbing property 4), the weight (mg) of absorbed water evaporated for 1 second from 1 m² of the surface layer at a temperature of 20° C. and a relative humidity of 60% was measured as the water-releasing property. A larger value is preferable. The practical necessary level is 15.0.

We claim:

1. A collagen powder wherein the content of particles having a particles size smaller than 40 μm is at least 85% by weight, the water absorption is 120 to 300%, and the apparent bulk density is 0.10 to 0.30 g/cc.

2. A collagen powder as set forth in claim 1, wherein the oil absorption is 0.80 to 1.70 ml/g.

3. A collagen powder as set forth in claim 1, wherein the median diameter of the particles is 4 to 25 μm and the maximum diameter is 63 μm.

4. A leather-like surface layer-forming agent comprising a synthetic resin binder and a collagen powder as set forth in claim 1.

5. A surface layer-forming agent as set forth in claim 4, wherein the oil absorption of the collagen powder is 0.80 to 1.70 ml/g.

6. A surface layer-forming agent as set forth in claim 4, wherein the median diameter of particles of the collagen powder is 4 to 25 μm and the maximum diameter is 63 μm.

7. A surface layer-forming agent as set forth in claim 4, wherein the collagen powder is contained in an amount of 30 to 200 parts by weight per 100 parts by weight of the resin solids.

8. A leather-like molded articles formed by melt-molding a composition comprising a thermoplastic resin and a collagen powder as set forth in claim 1.

9. A molded articles as set forth in claim 8, wherein the oil absorption of the collagen powder is 0.80 to 1.80 ml/g.

10. A molded article as set forth in claim 8, wherein the median diameter of particles of the collagen powder is 4 to 25 μm and the maximum diameter is 63 μm.

11. A molded article as set forth in claim 8, wherein the collagen powder is contained in an amount of 30 to 200 parts by weight per 100 parts by weight of the resin.

* * * * *